US009764493B2

(12) United States Patent
Tanaka et al.

(10) Patent No.: US 9,764,493 B2
(45) Date of Patent: Sep. 19, 2017

(54) METHOD FOR TRIMMING RECTANGULAR CONTAINER

(71) Applicant: TOYO SEIKAN GROUP HOLDINGS, LTD., Tokyo (JP)

(72) Inventors: Hiroki Tanaka, Yokohama (JP); Shinichi Miyose, Yokohama (JP)

(73) Assignee: Toyo Seikan Group Holdings, Ltd., Shinagawa-Ku, Tokyo (JP)

( * ) Notice: Subject to any disclaimer, the term of this patent is extended or adjusted under 35 U.S.C. 154(b) by 253 days.

(21) Appl. No.: 14/424,519

(22) PCT Filed: Aug. 27, 2013

(86) PCT No.: PCT/JP2013/072886
§ 371 (c)(1),
(2) Date: Feb. 27, 2015

(87) PCT Pub. No.: WO2014/034670
PCT Pub. Date: Mar. 6, 2014

(65) Prior Publication Data
US 2015/0224668 A1    Aug. 13, 2015

(30) Foreign Application Priority Data

Aug. 29, 2012  (JP) .................................. 2012-188730

(51) Int. Cl.
*B26F 1/14*     (2006.01)
*B29C 49/72*    (2006.01)
(Continued)

(52) U.S. Cl.
CPC .............. *B26F 1/14* (2013.01); *B23D 31/001* (2013.01); *B29C 49/72* (2013.01);
(Continued)

(58) Field of Classification Search
CPC ... B29C 49/92; B29C 49/74; B29C 2049/725; B29C 37/02; B29C 37/04; B29C 49/72; B26F 1/02; B26F 1/12; B26F 1/14
(Continued)

(56) References Cited

U.S. PATENT DOCUMENTS 3,432,586 A * 3/1969 Stenger ............... B29C 49/4278
   215/40
3,458,897 A * 8/1969 Roger ..................... B29C 49/50
   425/531
(Continued)

FOREIGN PATENT DOCUMENTS

JP          44-8357 B1     4/1969
JP          49-45491 A1    4/1974
(Continued)

OTHER PUBLICATIONS

Extended European Search Report (Application No. 13833475.0) dated Jul. 26, 2016.
(Continued)

*Primary Examiner* — Jason Daniel Prone
*Assistant Examiner* — Richard Crosby, Jr.
(74) *Attorney, Agent, or Firm* — Burr & Brown, PLLC

(57) ABSTRACT

A method for trimming a rectangular container and an apparatus trimming a rectangular container are provided, by which an appropriate cut surface with a possible crack or burr suppressed can be obtained when a rectangular container is trimmed. When a punch cutter is initially allowed to cut into a rectangular tubular portion of an untrimmed rectangular container, the punch cutter is inclined relative to a thickness direction of a cut area of the rectangular tubular portion, and then, the punch cutter is circumferentially moved along a trim line on the rectangular tubular portion to cut the rectangular tubular portion.

8 Claims, 15 Drawing Sheets

(51) Int. Cl.
*B23D 31/00* (2006.01)
*B21D 51/26* (2006.01)

(52) U.S. Cl.
CPC ...... *B21D 51/2615* (2013.01); *B21D 51/2646* (2013.01); *Y10T 83/0596* (2015.04); *Y10T 83/40* (2015.04)

(58) Field of Classification Search
USPC .................................................... 83/914, 30
See application file for complete search history.

(56) References Cited

U.S. PATENT DOCUMENTS

| | | | | | |
|---|---|---|---|---|---|
| 3,589,228 | A * | 6/1971 | Bourgeois | ............... | B29C 49/72 425/806 |
| 3,768,101 | A * | 10/1973 | Kuts | ............... | B26D 3/006 83/408 |
| 3,783,724 | A * | 1/1974 | Uhlig | ............... | B29C 49/50 425/806 |
| 3,795,162 | A * | 3/1974 | Jaeger | ............... | B29C 49/72 425/806 |
| 3,862,698 | A * | 1/1975 | Hafele | ............... | B65D 1/02 215/40 |
| 4,017,243 | A * | 4/1977 | Lindsay | ............... | B29C 49/50 425/292 |
| 4,892,018 | A * | 1/1990 | Boggs | ............... | B23D 79/02 30/140 |
| 4,895,743 | A * | 1/1990 | Peters | ............... | B29C 49/04 206/436 |
| 5,554,337 | A * | 9/1996 | Ihara | ............... | B29C 37/02 264/161 |
| 6,530,301 | B1 * | 3/2003 | Seitz | ............... | B29C 49/421 83/23 |
| 6,555,033 | B2 * | 4/2003 | Cargile | ............... | B29C 49/482 264/37.31 |
| 6,602,458 | B1 * | 8/2003 | Skov | ............... | B29C 49/4802 264/536 |
| 6,666,997 | B2 * | 12/2003 | Williams | ............... | B08B 7/0014 257/E21.504 |
| 2007/0089573 | A1 * | 4/2007 | Williams | ............... | B26D 3/166 82/47 |

FOREIGN PATENT DOCUMENTS

| | | |
|---|---|---|
| JP | 59-85623 U | 6/1984 |
| JP | 04-35820 U | 3/1992 |
| JP | 2008-162676 A1 | 7/2008 |
| JP | 2012-157959 A1 | 8/2012 |

OTHER PUBLICATIONS

English Translation of International Preliminary Report on Patentability (PCT/JP2013/072886) dated Mar. 12, 2015.
International Search Report (Application No. PCT/JP2013/072886) dated Nov. 26, 2013.

* cited by examiner

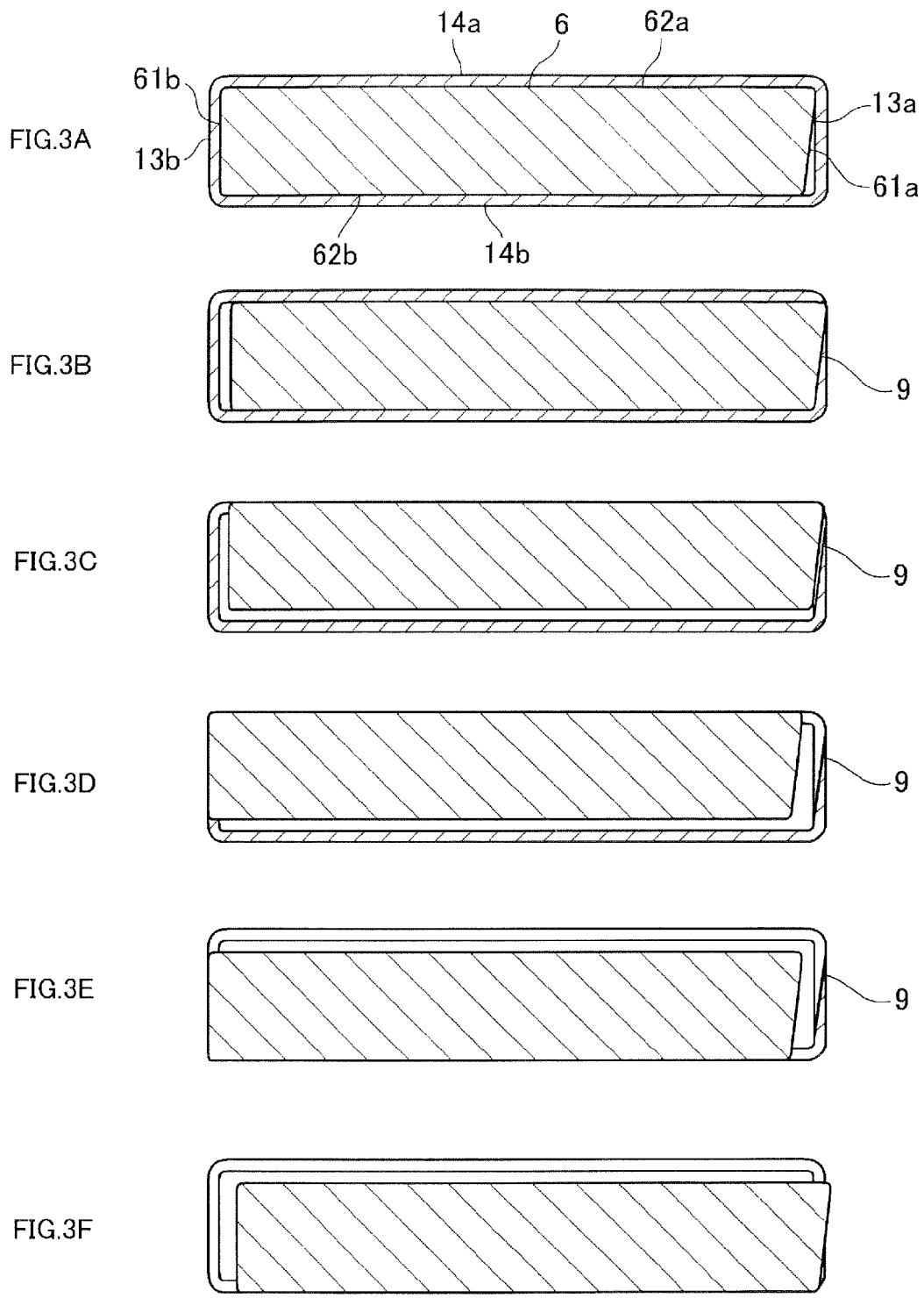

METHOD FOR TRIMMING RECTANGULAR CONTAINER

BACKGROUND OF THE INVENTION

Field of the Invention

The present invention relates to a method for trimming a rectangular container and an apparatus trimming a rectangular container, and in particular, to a method for trimming a rectangular container with a rectangular cross section and an apparatus trimming such a rectangular container.

Description of Related Art

A rectangular container shaped by drawing, drawing-ironing, or the like needs trimming, in a post-process, of an uneven edge of an opening in the rectangular container formed by these types of processing. Various trimming methods are known (Patent Literature 1 to 3).

Besides the methods in Patent Literature 1 to 3, a method for trimming a rectangular container is known in which short-side wall portions involving low cut loads are first removed (FIG. 13A) and in which long-side wall portions involving high cut loads are then removed (FIG. 13B), as depicted in FIG. 13. In such four-side cut trimming, a step is likely to be formed at the boundary between the short-side wall portion and the long-side wall portion on a trimmed end surface, as indicated by a dashed line in FIG. 14. Furthermore, the wall portions are cut by stroking a punch cutter on each side, and thus, at least four processes are needed. Moreover, a transfer press is used for cutting, and thus, a production rate is limited to 20 to 50 cpm (cans per minute: the number of cans produced per minute) in view of the life of a cam.

In view of a reduction in processes, a trimming apparatus is known by which a container is trimmed by circumferentially moving an inner-frame cutter (punch) as described in Patent Literature 2 and Patent Literature 3. However, with such a trimming apparatus, a removal portion and a part of a product portion (remaining portion) remain connected together until the end of the process. Thus, for a rectangular container with a rectangular cross section as depicted in FIG. 13, the removal portion is likely to move uncontrollably as the cutter moves, imposing a heavy load on the boundary between the removal portion and the product portion. As a result, stress is concentrated at the boundary, which gradually begins to split. This leads to a crack or burr in the product.

[Patent Literature 1] Japanese Patent Application Laid-open No. S49-45491

[Patent Literature 2] Japanese Patent Application Laid-open No. S44-8357

[Patent Literature 3] Japanese Utility Model Application Laid-open No. S59-85623

SUMMARY OF THE INVENTION

An object of the present invention is to provide a method for trimming a rectangular container and an apparatus trimming a rectangular container for the purpose of enhancing machining precision when trimming a rectangular container.

To accomplish the object, a method for trimming a rectangular container according to the present invention includes:

when initially allowing a punch cutter to cut into a rectangular tubular portion of the untrimmed rectangular container, inclining the punch cutter relative to a thickness direction of a wall portion of the rectangular tubular portion at a trim line on the rectangular tubular portion; and then circumferentially moving the punch cutter along the trim line on the rectangular tubular portion to cut the rectangular tubular portion.

The method for trimming a rectangular container according to the present invention may be configured as follows.

1. At least a cutting edge portion of the punch cutter which initially cuts into the rectangular tubular portion is nonparallel to the wall portion.
2. An entire circumference of a cutting edge portion of the punch cutter is nonparallel to the wall portion.
3. At least a cutting edge portion of the punch cutter which initially cuts into the rectangular tubular portion is triangular.
4. At least a cutting edge portion of the punch cutter which initially cuts into the rectangular tubular portion is shaped like a convex curve.
5. A cut made by the punch cutter in the inclined state is a cut made by moving the punch cutter in a direction of the inclination relative to the wall portion.
6. The rectangular container has a substantially rectangular cross section, and the punch cutter is initially allowed to cut into a short-side wall portion of the rectangular tubular portion.
7. A trajectory of circumferential movement of the punch cutter includes only a curved trajectory.

Furthermore, to accomplish the object, an apparatus trimming a rectangular container according to the present invention includes:

a die cutter that surrounds an outer periphery of a product portion of a rectangular tubular portion of the untrimmed rectangular container;

a mandrel disposed inside the product portion to sandwich the product portion between the mandrel and the die cutter; and a punch cutter that circumferentially moves along a circumference of the rectangular tubular portion relative to the die cutter and the mandrel to cut away a removal portion of the rectangular tubular portion, in which, when the punch cutter is initially allowed to cut into the rectangular tubular portion of the untrimmed rectangular container, the punch cutter is inclined relative to a thickness direction of a wall portion of the rectangular tubular portion at a trim line on the rectangular tubular portion; and then the punch cutter is circumferentially moved along the trim line on the rectangular tubular portion to cut the rectangular tubular portion.

The apparatus trimming the rectangular container according to the present invention may be configured as follows.

1. At least a cutting edge portion of the punch cutter which initially cuts into the rectangular tubular portion is nonparallel to the wall portion.
2. An entire circumference of a cutting edge portion of the punch cutter is nonparallel to the wall portion.
3. At least a cutting edge portion of the punch cutter which initially cuts into the rectangular tubular portion is triangular.
4. At least a cutting edge portion of the punch cutter which initially cuts into the rectangular tubular portion is shaped like a convex curve.
5. The punch cutter is moved in a direction of the inclination relative to the wall portion.
6. The rectangular container has a substantially rectangular cross section, and the punch cutter is initially allowed to cut into a short-side wall portion of the rectangular tubular portion.

7. A trajectory of circumferential movement of the punch cutter includes only a curved trajectory.

According to the present invention, the punch cutter is inclined relative to the thickness direction of the rectangular tubular portion when cutting into the rectangular tubular portion. Thus, a large connection portion can be left which keeps the removal portion and the product portion connected together until the end of the process. This enables the strength of the connection portion to be improved. Thus, the connection portion is restrained from being progressively split while the punch cutter is circumferentially moving, allowing suppression of a possible crack or bur in a product. Therefore, a preferable cut surface with no step can be obtained.

Furthermore, the present invention uses, for cutting, the punch cutter with the cutting edge portion nonparallel to at least the wall portion of the rectangular tubular portion into which is initially cut. Thus, a possible crack can be suppressed at the time of the initial cut. Furthermore, the inclination angle of a boundary line defined by the initial cut can be easily adjusted by the angle of the cutting edge portion to the wall portion.

Additionally, according to the present invention, the punch cutter is initially allowed to cut into the short-side wall portion of the rectangular tubular portion with the rectangular cross section, the short-side wall portion being more rigid than a long-side wall portion. Thus, a possible crack can be suppressed at the time of the initial cut.

In addition, according to the present invention, the trajectory of circumferential movement of the punch cutter includes only a curved trajectory. Thus, the movement of the punch cutter can be made faster.

BRIEF DESCRIPTION OF THE DRAWINGS

FIG. 3 is a schematic diagram illustrating a positional relation between the punch cutter and the surface, which is to be cutoff, of the rectangular container intermediate which is observed when the punch cutter follows a path C1 to C5 depicted in FIG. 2A.

FIG. 4 is a partly enlarged cross-sectional view of a short-side cutting edge portion of the punch cutter, in which

FIG. 13 is a perspective view depicting conventional four-cut trimming, in which

DETAILED DESCRIPTION OF THE INVENTION

An embodiment for carrying out the present invention will be described with reference to the drawings.

The materials, shapes, relative dispositions, and the like of components of the present embodiment may be appropriately changed and are not intended to limit the scope of the present invention to the present embodiment described below.

<Substantially Configuration of the Rectangular Container>

As depicted in FIG. 1, a rectangular container 1a is manufactured (a product shape is applied to the rectangular container 1a) by trimming (cutting) a removal portion 1b away from an intermediate 1.

Figure 1A:
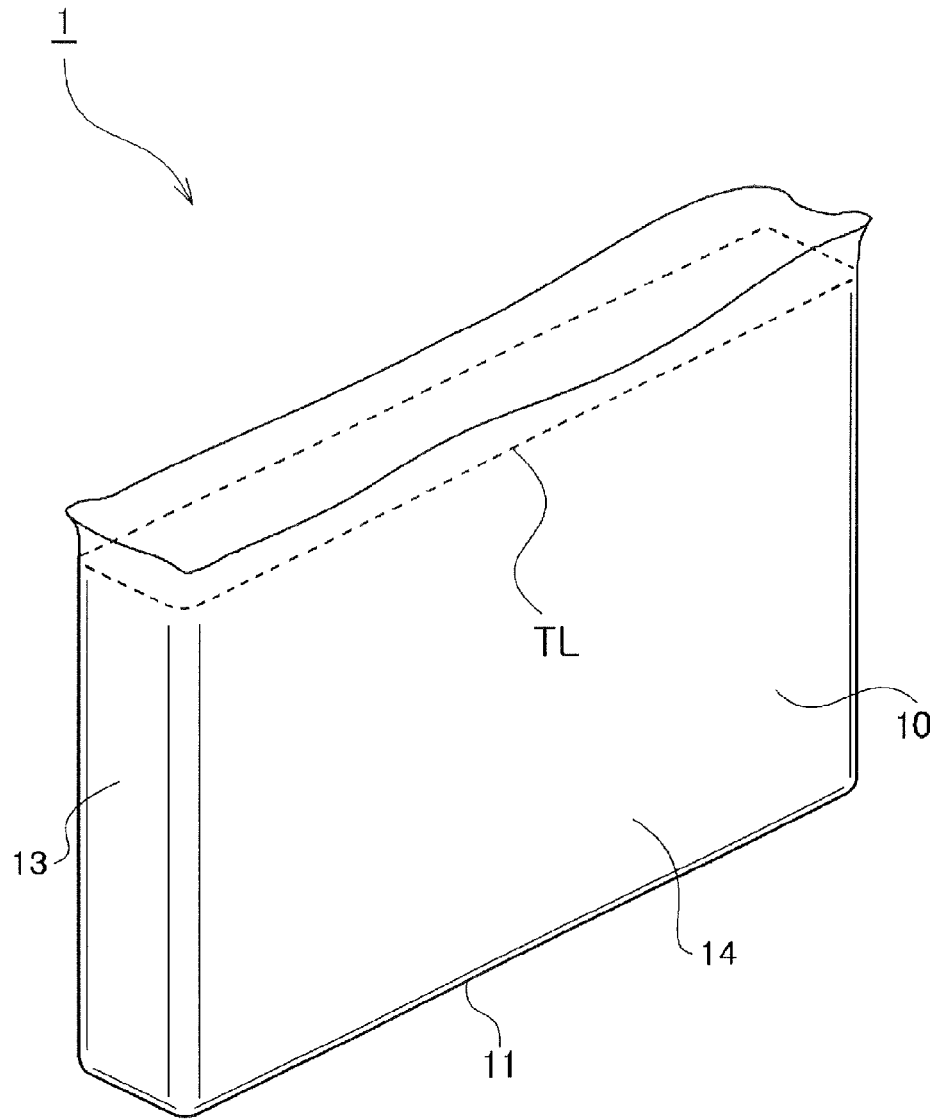
FIG. 1 is a perspective view depicting a configuration of a rectangular container manufactured using a method for trimming a rectangular container and an apparatus trimming a rectangular container according to the present invention, with FIG. 1A being a perspective view depicting an untrimmed state of a rectangular container intermediate, and FIG. 1B being a perspective view depicting a trimmed state of the rectangular container intermediate.
Figure 1B:
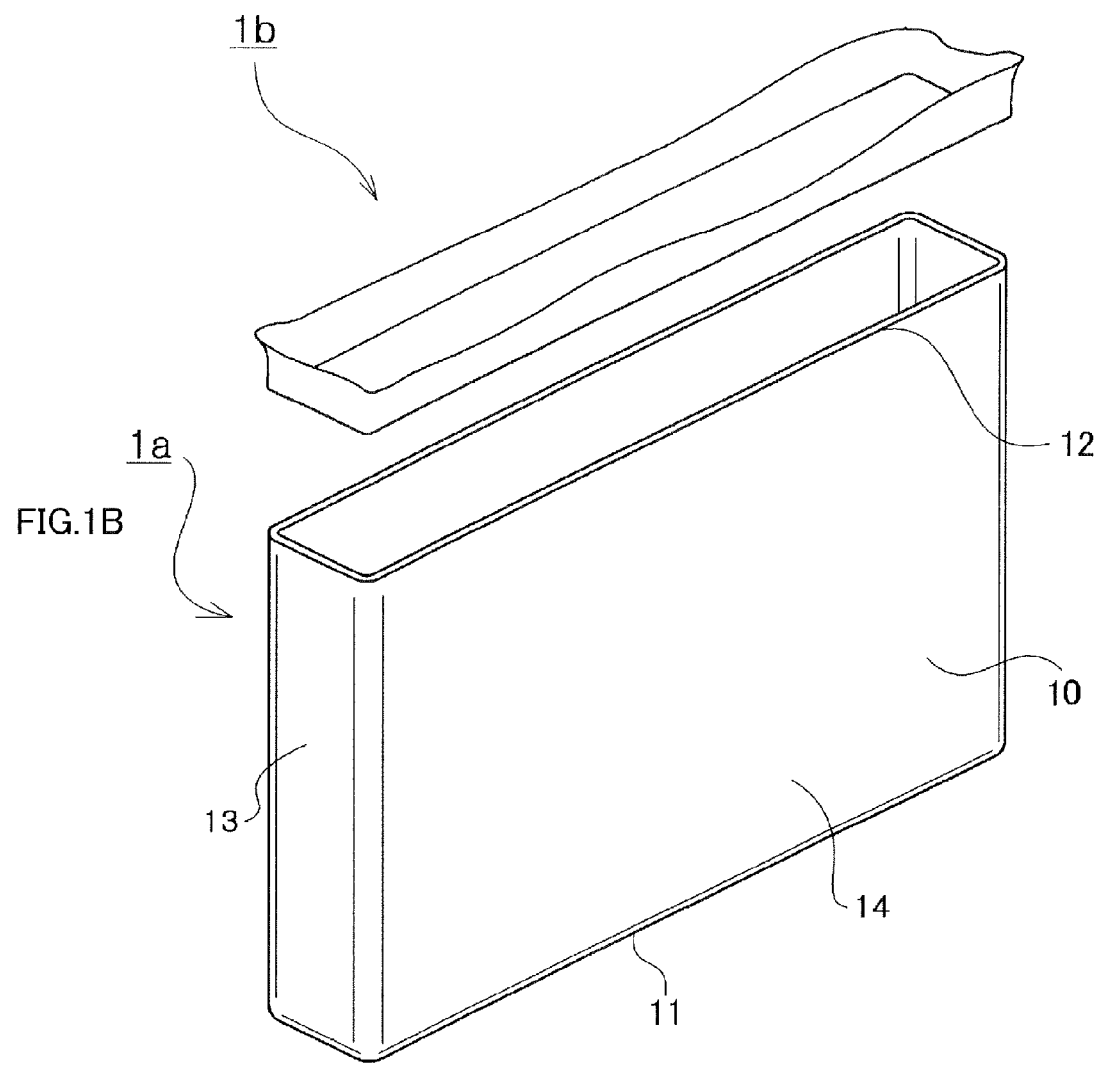

As depicted in FIG. 1B, the rectangular container 1a has a structure shaped like a bottomed cylinder and in which a rectangular tubular portion 10 and a bottom portion 11 are integrally molded. The rectangular tubular portion 10 has a substantially rectangular cross section and includes a substantially rectangular opening end surface 12, a pair of short-side wall portions 13 that forms short sides with a substantially rectangular cross section, and a pair of long-side wall portions 14 that forms long sides with a substantially rectangular cross section.

As depicted in FIG. 1A, the intermediate 1 includes the bottom portion 11, the short-side wall portions 13, and the long-side wall portions 14 and is molded to have the removal portion 1b as depicted in FIG. 1B. A method for manufacturing the intermediate 1 is not particularly limited but the intermediate may be molded using well-known drawing (deep drawing) or drawing-ironing or impact molding. Thus, a specific description of a machining method is omitted. An opening end of the intermediate 1 opposite to the bottom portion 11 has an irregular shape because the well-known machining has difficulty forming an even edge (height) of the opening end. The removal portion 1b, which is the irregular shape portion, is trimmed along a trim line TL to form the opening end surface 12 on the rectangular tubular portion 10. Thus, the final product shape of the rectangular container 1a is obtained.

The rectangular container 1a is manufactured from, for example, pure aluminum, or an aluminum alloy, or a metal plate such as an SPCE (cold rolled steel plate), an SUS (stainless steel), or an iron nickel steel plate. In an application of the rectangular container 1*a*, for example, the rectangular container 1*a* can be used as an outer can for a rectangular battery by housing various power generation elements (for example, electrodes, separators, and the like) providing a battery in the rectangular container 1*a*, and sealing the opening with a cap (not depicted in the drawings).

<Method for Trimming Rectangular Container>

An embodiment of the method for trimming a rectangular container according to the present invention will be described with reference to FIGS. 2 to 8.

The trimming method involves, as disclosed in Patent Literature 2 and 3 described above, allowing the punch cutter to cut from an inner peripheral surface side toward an outer peripheral surface side of the opening edge of the tubular portion and moving the punch cutter in a circumferential direction of the tubular portion to cut the removal portion of the opening edge to be removed by trimming, away from the product portion.

<<Punch Cutter>>

The outer peripheral shape of a cutting edge portion 60 of a punch cutter 6 used for the method for trimming a rectangular container according to the present invention substantially conforms to the inner peripheral shape of the rectangular tubular portion 10 of the intermediate 1. That is, the cutting edge portion 60 includes short-side cutting edge portions 61*a* and 61*b* opposite to a pair of short-side wall portions 13*a* and 13*b*, respectively, of the rectangular tubular portion 10 and long-side cutting edge portions 62*a* and 62*b* opposite to a pair of long-side wall portions 14*a* and 14*b*, respectively. The short-side cutting edge portions 61*a* and 61*b* and the long-side cutting edge portions 62*a* and 62*b* are continuously connected together with curved cutting edge portions to form a cutting edge portion 60 in an annular shape (not illustrated in detail in the figure) (the cutting edge portion 60 will be described below using FIG. 10).

In the punch cutter 6 according to the present embodiment, the short-side cutting edge portion 61*a* of the cutting edge portion 60 which is opposite to the short-side wall portion 13*a* is configured to be nonparallel to the short-side wall portion 13*a*. The other cutting edge portions are configured to be parallel to the opposite wall portions.

<<Movement Path of the Punch Cutter>>

Figure 2A:
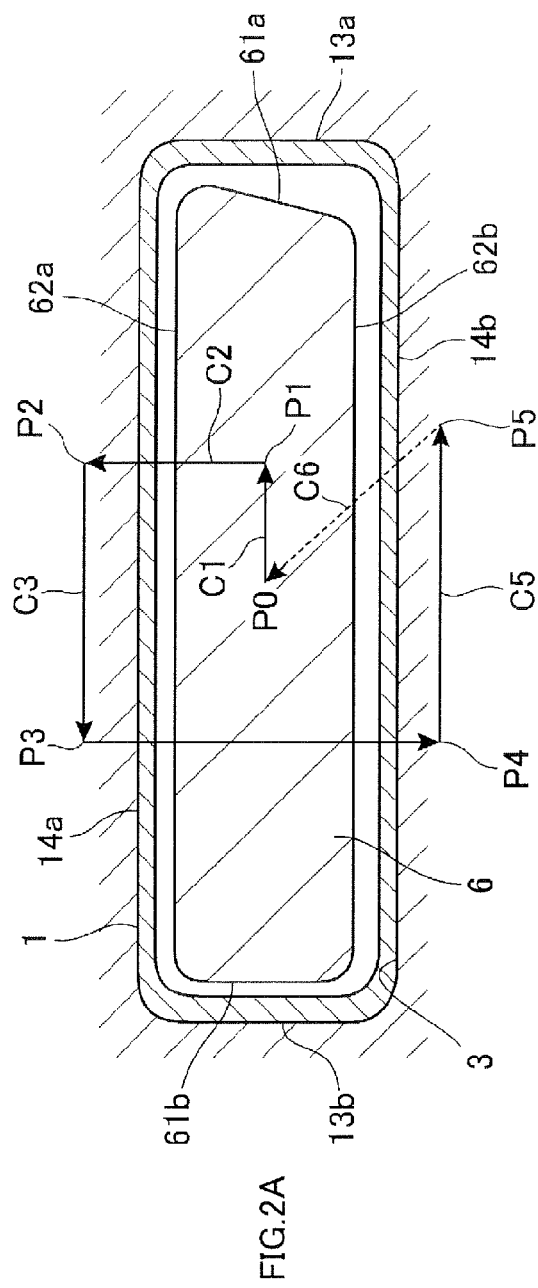
FIG. 2 is a schematic diagram depicting a configuration of a punch cutter used for the method for trimming a rectangular container according to the present invention, with FIG. 2A being a schematic diagram of the punch cutter and a surface, which is to be cut off, of the rectangular container intermediate, and with FIG. 2B being a schematic diagram depicting a movement path of the center of gravity of the punch cutter.

Arrows C1 to C6 depicted in FIG. 2A indicate a path (trajectory) along which the center of gravity of the punch cutter 6 moves when the punch cutter 6 moves. (In FIG. 2A, the sizes of the arrows are depicted to be larger than the actual amounts of movement in order to make the movement direction of the center of gravity of the punch cutter 6 easily understood). Furthermore, relay points P0 to P5 between the arrows C1 to C6 are points passed by the center of gravity of the punch cutter 6. In the present embodiment, P2 to P4 denote points through which the center of gravity of the punch cutter 6 passes in order to obtain an amount of cutting that allows the punch cutter 6 to reliably cut the wall portions 14*a*, 13*b*, and 14*b* of the intermediate 1. For example, when the center of gravity of the punch cutter 6 moves to P2, the long-side cutting edge portion 62*a* of the punch cutter 6 is positioned at an outer edge of the rectangular container long-side wall portion 14*a*.

Figure 2B:
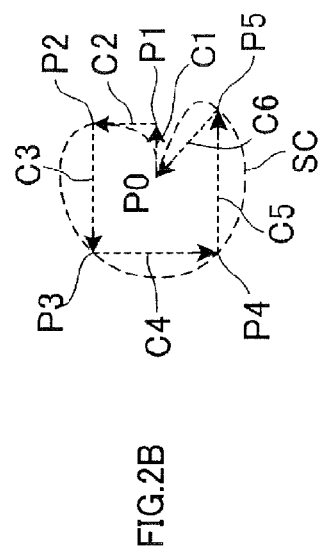

A coarsely dashed arrow SC in FIG. 2(B) depicts a shortcut path. The shortcut path SC is formed only of a curved path in order to allow the punch cutter 6 to take a shortcut without passing the first relay point P1 and to pass each of the relay points P0 and P2 to P5. The first relay point P1 need not be reached when the vicinity of the relay point P1 is passed as long as formation of an oblique boundary line described below is ensured due to initial cut. Thus, the movement distance from the home position P0 to the relay point P2 can be shortened.

When the punch cutter 6 follows a curved path like the shortcut path SC in FIG. 2(B), the amount of overlap (see a dimension L in FIG. 10) of the punch cutter 6 with the die cutter 3 increases by a value equal to the amount by which the distance of the center of gravity from the relay point P0 is displaced outward from the line of arrows C3 to C5. Thus, a part of the removal portion 1*b* cut away from the product portion of the intermediate 1 is likely to move uncontrollably as the punch cutter 6 moves. Consequently, a load is likely to be imposed on the boundary between the removal portion 1*b* and the product portion (rectangular container 1*a*) of the intermediate 1. Therefore, to restrain the boundary portion from being progressively split as a result of stress concentration, the degree of curvature of the movement path of the punch cutter 6, that is, the degree by which the linear trajectory C1 to C6 in FIGS. 2A and 2B can be brought closer to a curved trajectory like the shortcut path SC depicted in FIG. 2B, is appropriately set in accordance with product specifications or the like.

As described above, the movement path of the punch cutter 6 is formed only of the curved paths to eliminate or reduce rapid turnarounds, allowing the punch cutter 6 to be driven faster. When the movement path of the punch cutter 6 is formed only of linear paths, for example, when the punch cutter 6 is turned around through 90 degrees at a high speed, the apparatus may be, for example, damaged by an impact. Furthermore, in connection with the inertia mass of a driven point on the apparatus, when a sudden stop is followed by an abrupt acceleration with the direction changed, the acceleration and deceleration are limited. On the other hand, when the punch cutter 6 is moved along a curved path, the acceleration and deceleration can be naturally and efficiently achieved simultaneously in both X and Y directions. For example, the direction can be freely changed by accelerating moderately in the Y direction while decelerating moderately in the X direction. Therefore, movement along the curved trajectory needs to go a slightly longer way around than movement along the linear trajectory but avoids imposing a mechanical load on a driving mechanism 7 and enables a faster operation. The path may be a combination of the linear trajectory and the curved trajectory. That is, if a path with no sudden turnaround is formed for the punch cutter 6, the path may be an appropriate combination of the linear trajectory and the curved trajectory.

FIG. 3 is a schematic diagram depicting a positional relation between the punch cutter 6 and the intermediate 1 which is observed when the punch cutter 6 follows the path C1 to C5 depicted in FIG. 2A. FIG. 3 assumes that the external shape of the rectangular tubular portion 10 of the intermediate 1 is substantially the same as the shape of an inner peripheral surface of the die cutter 3, with no clearance between the rectangular tubular portion 10 and the die cutter 3. In actuality, a design clearance is provided.

FIG. 3A depicts a positional relation between the punch cutter 6 and the intermediate 1 which is observed when the center of gravity of the punch cutter 6 lies at the home position P0. That is, FIG. 3A depicts a state where the intermediate 1 is set at a predetermined position for trimming.

FIG. 3B depicts a positional relation between the punch cutter 6 and the intermediate 1 which is observed when the center of gravity of the punch cutter 6 lies at the relay point P1. That is, FIG. 3B depicts a state where the center of gravity of the punch cutter 6 has followed the path C1 in FIG. 2A from the home position P0 to move rightward and reached the relay point P1. This movement causes the short-side cutting edge portion 61*a* to cut into the short-side wall portion 13*a*. The short-side cutting edge portion 61*a* is inclined relative to the short-side wall portion 13*a*, the punch cutter 6 is inclined, during cutting, relative to the thickness direction of the short-side wall portion 13*a* on the trim line. Furthermore, the short-side cutting edge portion 61*a* is not allowed to penetrate the short-side wall portion 13*a*, and thus, a cut formed in the short-side wall portion 13*a* is substantially chevron-shaped in a cross section along the trim line. That is, in a cross section along the trim line, one boundary line (cut line) between a cut area and a non-cut area of the short-side wall portion 13*a* defined by the short-side cutting edge portion 61*a* is a boundary line 9 extending in a direction inclined relative to the thickness direction of the short-side wall portion 13*a*. Ina trimming process with the punch cutter 6 according to the present embodiment, the boundary line 9 is left until a final cutting process where the removal portion 1*b* is completely cut away from the product portion of the intermediate 1.

FIG. 3C depicts a positional relation between the punch cutter 6 and the intermediate 1 which is observed when the center of gravity of the punch cutter 6 lies at the relay point P2. That is, FIG. 3C depicts a state where the center of gravity of the punch cutter 6 has followed the path C2 in FIG. 2A from the relay point P1 to move inward and reached the relay point P2. This movement cuts away most of the long-side wall portion 14*a* and the connection portion between the long-side wall portion 14*a* and the short-side wall portion 13*a*. That is, the cut end defined by the initial cut made by the punch cutter 6 is extended over most of the entire area of the long-side wall portion 14*a* with the boundary line 9 left (the other boundary line moves to the vicinity of the short-side wall portion 13*b*).

FIG. 3D depicts a positional relation between the punch cutter 6 and the intermediate 1 which is observed when the center of gravity of the punch cutter 6 lies at the relay point P3. That is, FIG. 3D depicts a state where the center of gravity of the punch cutter 6 follows the path C3 in FIG. 2A from the relay point P2 to move leftward and reached the relay point P3. This movement cuts away the remaining part of the long-side wall portion 14*a*, the connection portion between the long-side wall portion 14*a* and the short-side wall portion 13*b*, and most of the short-side wall portion 13*b*. That is, the cut end defined by the initial cut made by the punch cutter 6 is further extended over most of the entire area of the short-side wall portion 13*b* with the boundary line 9 left (the other boundary line moves to the vicinity of the long-side wall portion 14*b*).

FIG. 3E depicts a positional relation between the punch cutter 6 and the intermediate 1 which is observed when the center of gravity of the punch cutter 6 lies at the relay point P4. That is, FIG. 3E depicts a state where the center of gravity of the punch cutter 6 follows the path C4 in FIG. 2A from the relay point P3 to move forward and reached the relay point P5. This movement cuts away the remaining part of the short-side wall portion 13*b*, the connection portion between the short-side wall portion 13*b* and the long-side wall portion 14*b*, and most of the long-side wall portion 14*b*. That is, the cut end defined by the initial cut made by the punch cutter 6 is further extended over most of the entire area of the long-side wall portion 14*b* with the boundary line 9 left (the other boundary line moves to the vicinity of the short-side wall portion 13*a*). At this point in time, the connection portion remaining between the removal portion 1*b* and the product portion (rectangular container 1*a*) of the intermediate 1 is the small remaining part of the long-side wall portion 14*b*, the connection portion between the long-side wall portion 14*b* and the short-side wall portion 13*a*, and the connection area of the short-side wall portion 13*a* left across the boundary line 9.

FIG. 3F depicts a positional relation between the punch cutter 6 and the intermediate 1 which is observed when the center of gravity of the punch cutter 6 lies at the relay point P5. That is, FIG. 3F depicts a state where the center of gravity of the punch cutter 6 follows the path C5 in FIG. 2A from the relay point P4 to move rightward and reached the cutting end point P5. This state corresponds to a final cutting process where the punch cutter 6 completely cuts the removal portion 1*b* away from the product portion (rectangular container 1*a*) of the intermediate 1. In FIG. 3F, the punch cutter 6 moves to a position immediately before a position where the punch cutter 6 cuts completely through the connection portion between the long-side wall portion 14*b* and the short-side wall portion 13*a* to cut away the part of the removal portion 1*b* which remains at the end by means of the impact of the movement. However, the punch cutter 6 may be allowed to cut completely through the connection portion to cut away the removal portion 1*b* depending on conditions such as the material and the punch cutter. When the final cutting ends, the punch cutter 6 follows the path C6 in FIG. 2A from the cutting end point P5 to return to the home position P0.

In the present embodiment, the punch cutter 6 moves relative to the intermediate 1 with the angle of the punch cutter 6 unchanged, and thus, the inclination angle of the short-side cutting edge portion 61*a* remains equal to the inclination angle of the boundary line 9 throughout the trimming process. Thus, in the final cutting process, the short-side cutting edge portion 61*a* of the punch cutter 6 overlaps the boundary line 9 in the middle of movement. The cut end defined on the short-side wall portion 13*a* by the initial cut is also spread in a direction opposite to the above-described direction by the short-side cutting edge portion 61*a* (and also the curved cutting edge portion between the short-side cutting edge portion 61*a* and the long-side cutting edge portion 62*a* depending on the path) to cut away all of the remaining connection portion.

Figure 4A:
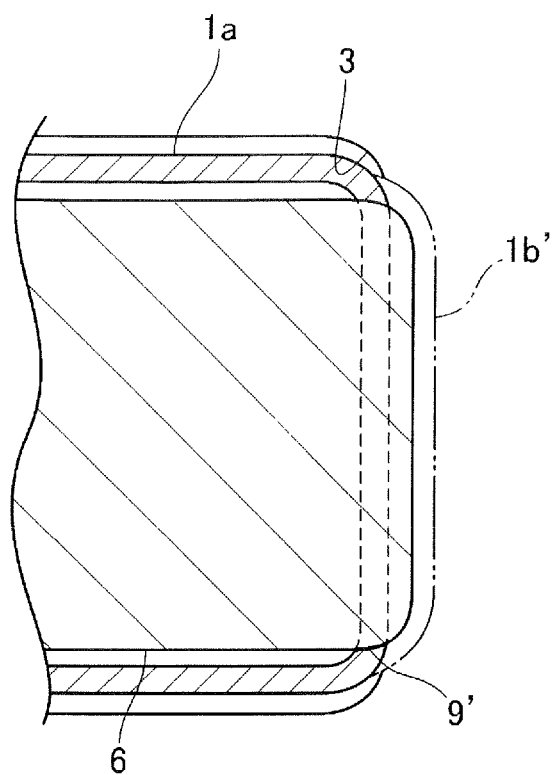
FIG. 4A is a cross-sectional view depicting a case where the short-side cutting edge portion is not inclined.

FIG. 4 is a partly enlarged cross-sectional view of the punch cutter 6 which depicts a comparison between a case where the short-side cutting edge portion 61*a* of the punch cutter 6 is inclined and a case where short-side cutting edge portion 61*a* is not inclined. As depicted in FIG. 4A, when the short-side cutting edge portion 61*a* is not inclined, a boundary line 9' between the cut area and non-cut area of the short-side wall portion 13*a* is formed substantially along the thickness direction of the short-side wall portion 13*a*. In this case, most of the short-side wall portion 13*a* is cut away, with substantially no non-cut area remaining. Furthermore, the cut part 1*b'* of the removal portion 1*b* is significantly displaced from the product portion and significantly deformed near the boundary line 9' relative to the product portion, in accordance with the amount by which the punch cutter 6 cuts into the removal portion 1*b* (the amount of overlap with the die cutter 3).

Figure 4B:
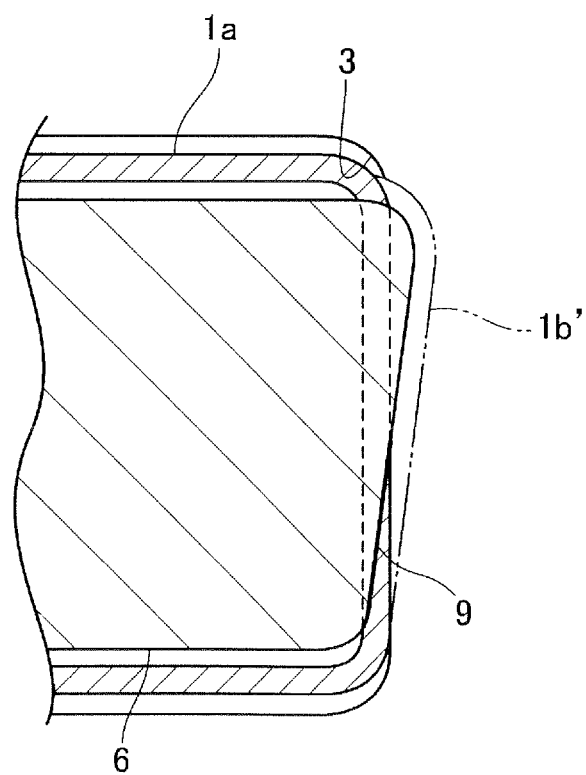
FIG. 4B is a cross-sectional view depicting a case where the short-side cutting edge portion is inclined.

On the other hand, as depicted in FIG. 4B, when the short-side cutting edge portion 61*a* is inclined, the boundary line 9 extends and inclines significantly in a circumferentially moving direction of the punch cutter 6 (a direction along the circumferential surface of the short-side wall portion 13a) relative to the thickness direction of the short-side wall portion 13a. In this case, the non-cut area is left in the short-side wall portion 13a over a range wider than the range in the case where the short-side cutting edge portion 61a is not inclined. Furthermore, the amount of overlap of the punch cutter 6 with the die cutter 3 is large in an area beyond the cut line 9. Thus, the cut portion 1b' is less significantly deformed relative to the product portion, and the deformation in the direction of the deformation relative to the product portion is also gentle along the cut line 9.

When a larger part of the non-cut area is left in the short-side wall portion 13a as described above, the strength of the connection portion between the cut portion and the product portion can be increased. Furthermore, when such a connection portion is maintained until the final cutaway process for the removal portion 1b, stress concentration at the connection portion is relieved which is caused by uncontrollable movement of the cut portion 1b' of the removal portion 1b in connection with the movement of the punch cutter 6. This restrains the connection portion from being progressively split.

Moreover, when the apparatus is configured such that the inclined short-side cutting edge portion 61a cuts substantially perpendicularly into the short-side wall portion 13a, that is, such that the short-side cutting edge portion 61a has a what is called shear angle, a cutting load associated with the initial cut is reduced, suppressing a possible split at the time of cutting.

Figure 5:
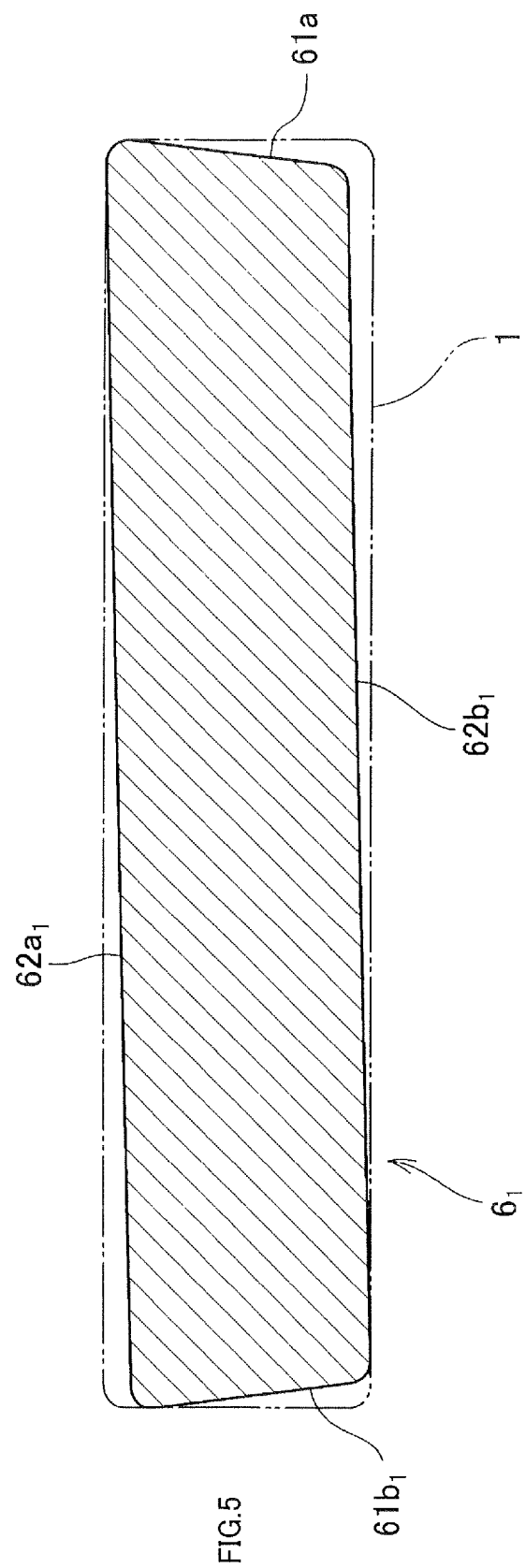
FIG. 5 is a schematic diagram depicting a variation 1 of the punch cutter.

FIG. 5 is a schematic diagram depicting a variation 1 of the above-described punch cutter 6. A punch cutter $6_1$ is configured to have a shear angle not only on the short-side cutting edge portion 61a but also on a short-side cutting edge portion 61b1 and long-side cutting edge portions 62a1 and 62b1. That is, the short-side cutting edge portions and the long-side cutting edge portions are all configured to be nonparallel to the short-side wall portions and long-side wall portions of the intermediate 1. Thus, the cutting load can be reduced over approximately the entire circumference of the intermediate 1. The present invention is not limited to the above-described configurations, and the configuration may be any of various combinations of the parallel cutting edge portions and nonparallel cutting edge portions.

Figure 6:
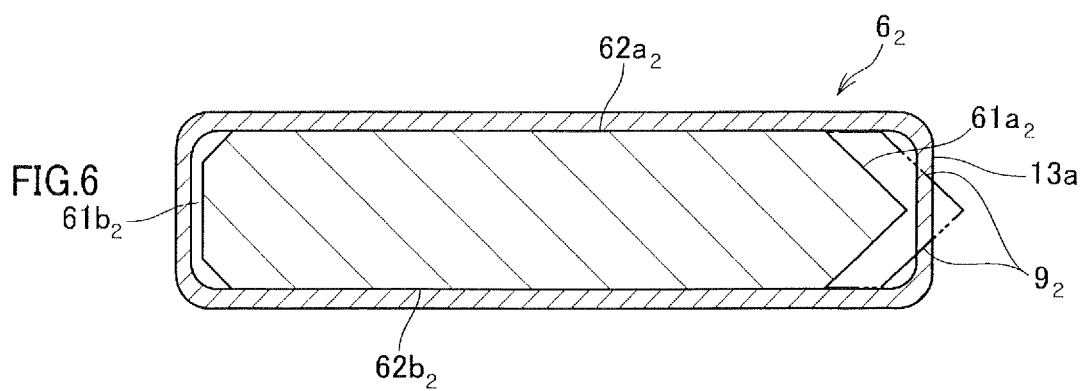
FIG. 6 is a schematic diagram depicting a variation 2 of the punch cutter.

Furthermore, FIG. 6 is a schematic diagram depicting a variation 2 of the punch cutter 6. In a punch cutter $6_2$, a short-side cutting edge portion 61a2 is shaped like a triangle. The short-side cutting edge portion 61a2 initially cuts into the intermediate 1 to form two inclined boundary lines $9_2$ in the intermediate 1. Thus, trimming can be achieved by advancing the punch cutter not only counterclockwise but also clockwise. Additionally, the short-side cutting edge portion 61a2 is preferably shaped like an isosceles triangle as depicted in FIG. 6. Vertices (angular corners) of the triangle may be appropriately dropped. The configurations of the short-side cutting edge portion 61b2 and the long-side cutting edge portions 62a2 and 62b2 are not particularly limited.

Figure 7:
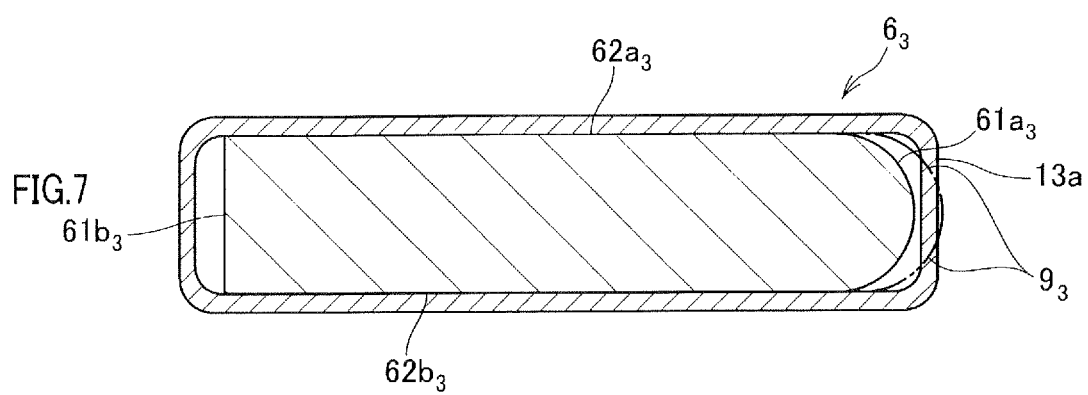
FIG. 7 is a schematic diagram depicting a variation 3 of the punch cutter.

Additionally, FIG. 7 is a schematic diagram depicting a variation 3 of the punch cutter 6. In a punch cutter $6_3$, a short-side cutting edge portion 61a3 is shaped like a convex curve. The short-side cutting edge portion 61a3 initially cuts into the short-side wall portion 13a to form two boundary lines $9_3$ inclined line circular arcs, in the intermediate 1. Thus, trimming can be achieved by advancing the punch cutter not only counterclockwise but also clockwise. The convex curve shape of 61a3 may be a circular arc, an elliptic arc, a quadratic curve, or the like as depicted in FIG. 7. The configurations of the short-side cutting edge portion 61b3 and long-side cutting edge portions 62a3 and 62b3 are not particularly limited.

Figure 8:
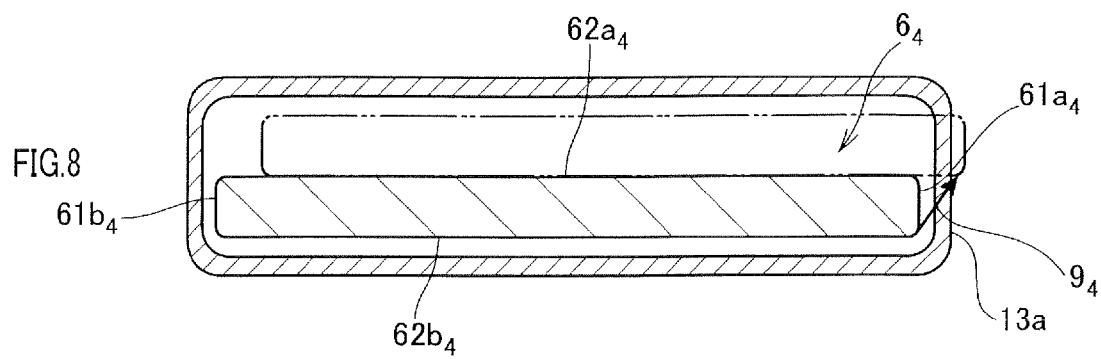
FIG. 8 is a schematic diagram depicting a variation 4 of the punch cutter.

Moreover, FIG. 8 is a schematic diagram depicting a variation 4 of the punch cutter 6 and the usage of the variation 4. A punch cutter $6_4$ is configured to be thinner than the punch cutter 6 according to FIG. 2 described above. That is, the configuration of long-side cutting edge portions 62a4 and 62b4 is similar to the corresponding configuration in the punch cutter 6 according to FIG. 2, and short-side cutting edge portions 61a4 and 61b4 are also configured to have a small width. Then, when initially cutting into the short-side wall portion 13a of the intermediate 1, the punch cutter $6_4$ is moved in a substantially oblique direction relative to the short-side wall portion 13a to form an inclined boundary line $9_4$ in the intermediate 1.

<Apparatus Trimming a Rectangular Container>

Now, an embodiment of an apparatus trimming a rectangular container according to the present invention will be described with reference to FIGS. 9 to 12. The apparatus trimming a rectangular container according to the present embodiment is an apparatus configured to trim the intermediate 1 by circumferentially moving the punch cutter.

Figure 9:
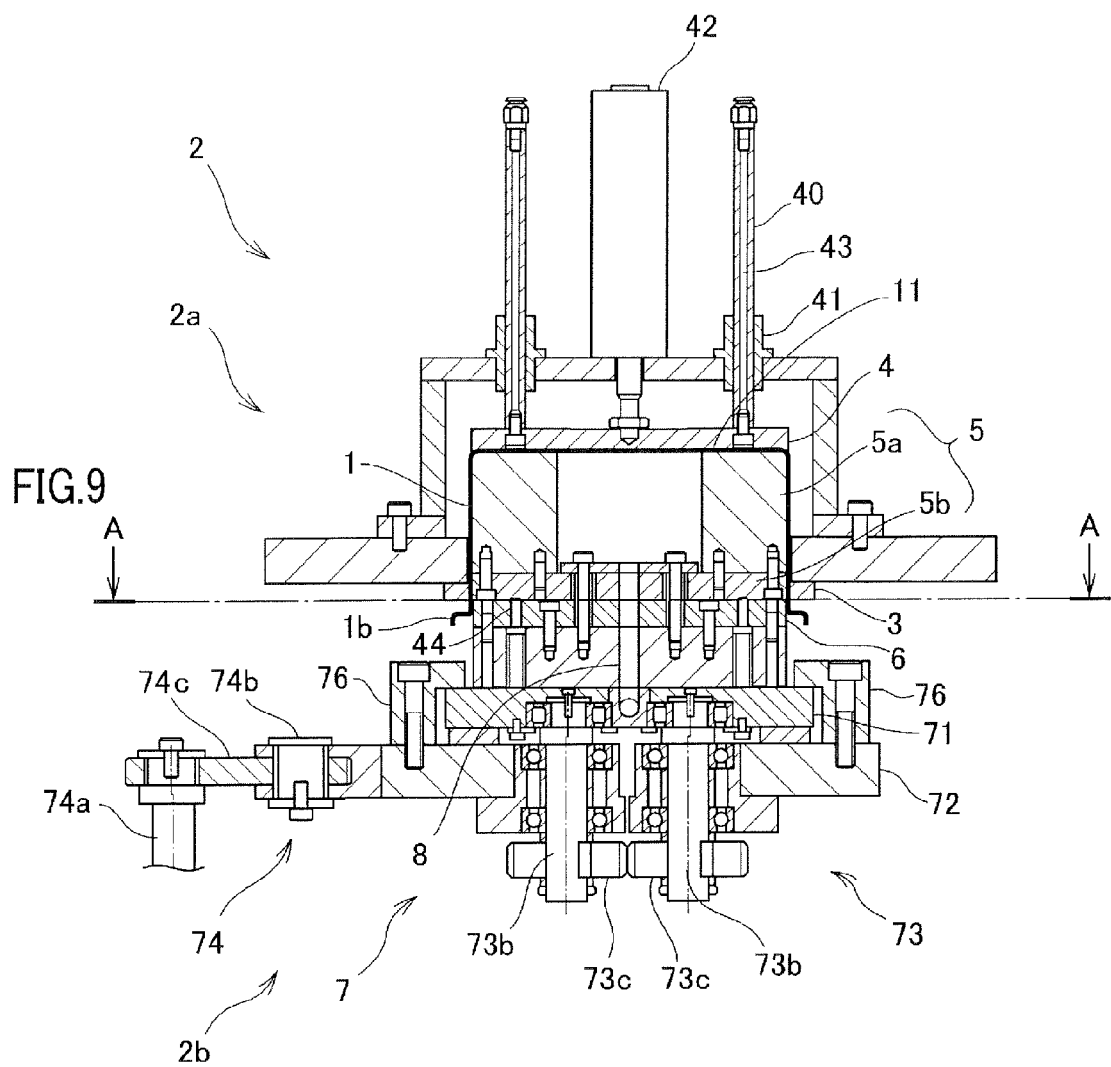
FIG. 9 is a schematic cross-sectional view of an apparatus trimming a rectangular container according to the present invention as seen from the front.

As depicted in FIG. 9, the apparatus 2 trimming a rectangular container according to the present invention substantially includes an upper frame 2a and a lower frame 2b. The upper frame 2a includes the die cutter 3 and a bottom pad 4. The lower frame 2b includes a mandrel 5, the punch cutter 6, the driving mechanism 7 that moves the punch cutter 6 relative to the mandrel 5, and an air vacuum hole 8 through which vacuumization is performed in order to insert the mandrel 5 into the product and through which air is fed in order to pull the mandrel 5 out from the product.

The upper frame 2a and the lower frame 2b are configured to be able to move up and down to come into contact with and separate from each other. The above-described intermediate 1 is held by the upper frame 2a with the removal portion 1b down. The upper frame 2a and the lower frame 2b approach each other to place the intermediate 1 over the mandrel 5 of the lower frame 2b.

Pins 40 are guided along an up-down stroke by a guide 41 provided on the frame of the upper frame 2a to press the bottom pad 4 against a lower surface of the bottom portion 11 of the intermediate 1 with a pressing force adjusted by an air cylinder 42. Thus, the intermediate 1 is prevented from being displaced upward or downward during trimming. Furthermore, a vacuum hole 43 is formed in each of the pins 40 to allow the product (rectangular container 1a) to be drawn out from the mandrel 5 after trimming.

The mandrel 5 includes a guide portion 5a that guides an inner peripheral surface of the intermediate 1 when the intermediate 1 is placed over the mandrel 5, and a support portion 5b that supports an area of an inner peripheral surface of the rectangular tubular portion 10 which lies on an inward side of the intermediate compared to the trim line (bottom portion 11 side). The support portion 5b is designed so as to form a predetermined clearance (for example, 0.1 mm) between the support portion 5b and the inner peripheral surface of the rectangular tubular portion 10. However, the clearance is designed to be as small as possible in order to prevent the intermediate 1 from being collapsed, damaged, or abnormally deformed.

A lower surface of the support portion 5b of the mandrel 5 and an upper surface of the punch cutter 6 slidably abut against each other. The boundary line between the lower surface and the upper surface is equal in height to the trim line on the intermediate 1. When the punch cutter 6 is moved in a horizontal direction by the driving mechanism 7 described below, movement of the mandrel 5 is regulated by the die cutter 3 via the intermediate 1.

Well-known positioning pin structures are provided on the slidable surfaces of the mandrel 5 and the punch cutter 6. When the movement restriction imposed on the mandrel 5 by the die cutter 3 is lifted, the mandrel 5 and the punch cutter 6 are automatically positioned relative to each other so as to return to the home position (origin) where the mandrel 5 and the punch cutter 6 overlap each other at substantially the same position in a plan view. In the present embodiment, pins 44 biased toward the slidable surface of the mandrel 5 by bias means such as a spring are provided in the slidable surface of the punch cutter 6. Dish-like recess portions having a sectional curvature greater than those of spherical head portions at the tips of the pins and having a larger diameter than the pins are formed in the slidable surface of the mandrel 5 at positions opposite to the tips of the pins 44 in the mandrel 5 located at the home position. When no external force is applied in the horizontal direction, the mandrel 5 and the punch cutter 6 move relative to each other so as to bring the pin tips into abutting contact with the deepest parts (central parts) of the recess portions by means of the bias force of the bias means. Thus, the center of the mandrel 5 aligns with the center of the punch cutter 6. This configuration is only an example, and another conventional technique may be appropriately applicable.

Figure 10:
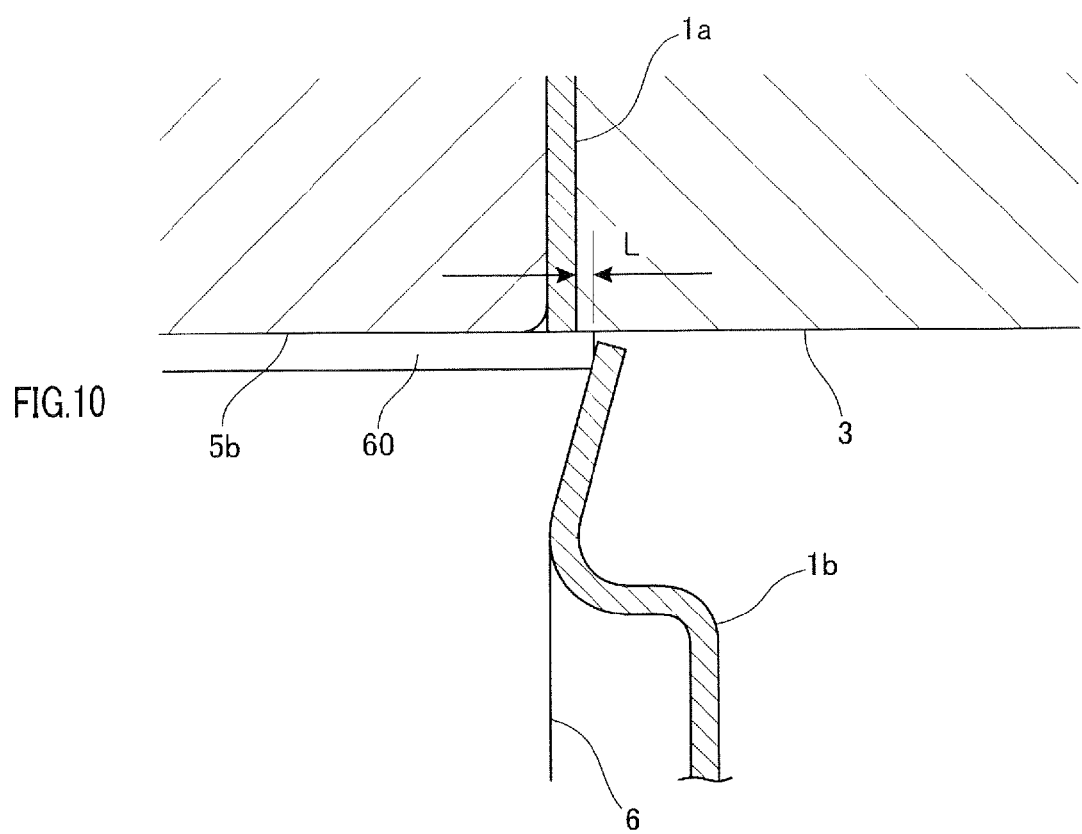
FIG. 10 is an enlarged cross-sectional view of the vicinity of a trim line made by the apparatus trimming a rectangular container according to the present invention.

As depicted in FIG. 10, the punch cutter 6 has the cutting edge portion 60 slightly projecting outward. The cutting edge portion 60 is provided all over the circumference of an edge of an outer peripheral surface of the punch cutter 6 which edge defines a boundary between the punch cutter 6 and the support portion 5b of the mandrel 5. The punch cutter 6 is moved in the horizontal direction (the direction along the trim line) relative to the mandrel 5 by means of the driving mechanism 7 described below to allow the removal portion 1b to be trimmed away from the intermediate 1.

<Driving Mechanism for the Punch Cutter>

Figure 11:
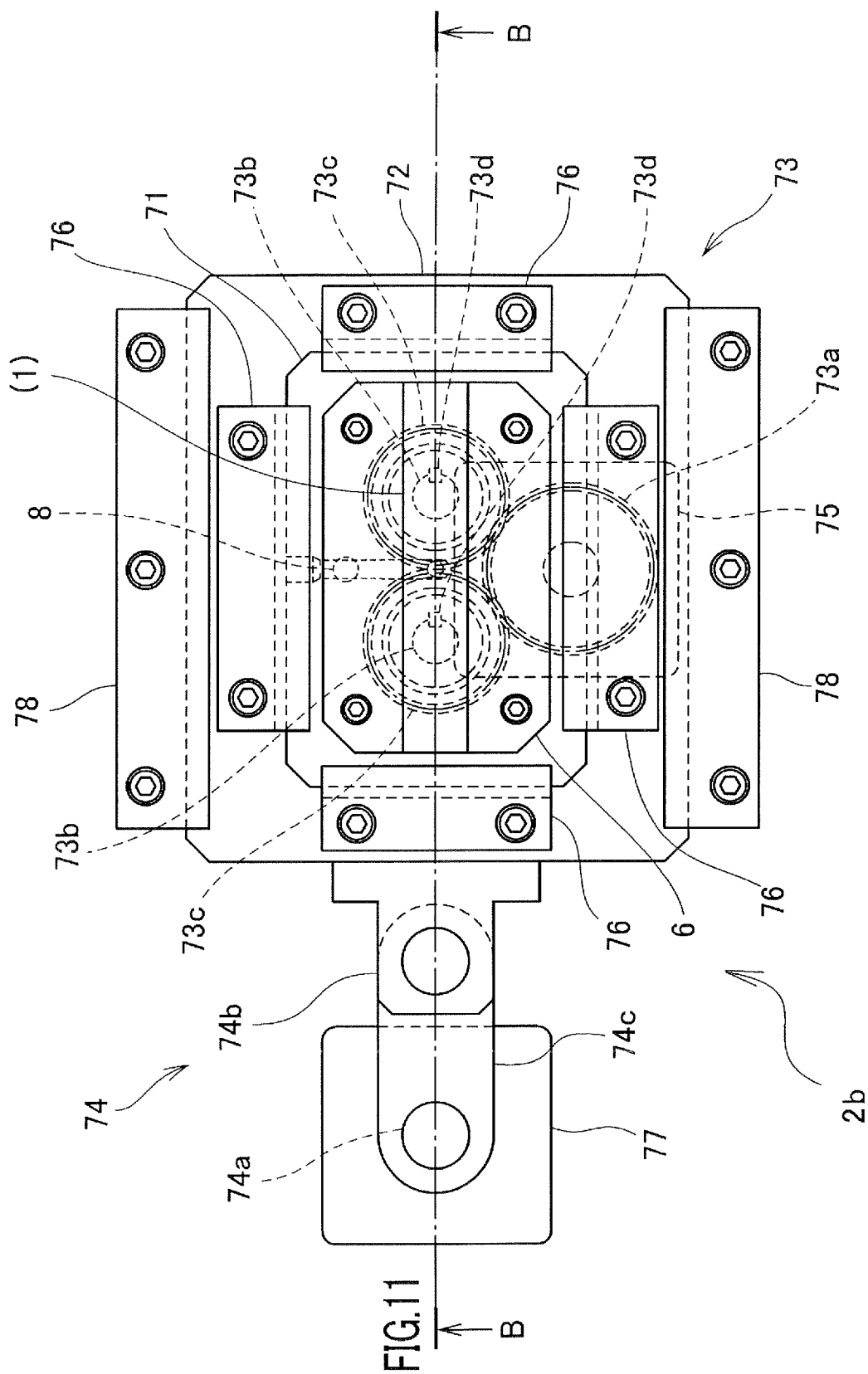
FIG. 11 is a plan view of a lower frame of the apparatus trimming a rectangular container according to the present invention.

As depicted in FIG. 9 and FIG. 11, the driving mechanism 7 combines rotating motion and reciprocating motion to move the punch cutter 6 in the horizontal direction relative to the fixed die cutter 3 (upper frame 2a) and the mandrel 5. The driving mechanism 7 substantially includes an upper stand 71 that supports the mandrel 5 and the punch cutter 6, a lower stand 72 that supports the upper stand 71 so that the upper stand 71 is rotationally movable, a rotation mechanism 73 that rotationally moves the upper stand 71 relative to the lower stand 72, and a linear motion mechanism 74 that reciprocates the lower stand 72 in the horizontal direction.

The rotation mechanism 73 includes gears 73a coupled to a servo motor 75 and a pair of eccentric pins 73b that is rotated by mechanical power transmitted via the gears 73a. The pair of eccentric pins 73b has gears 73c which mesh with the gears 73a and which have the same diameter and pitch as the diameter and pitch of the gears 73a. The upper stand 71 is rotationally movably supported by each pin of the pair of eccentric pins 73b. The upper stand 71 is supported at eccentric positions 73d that are in phase with the respective pins of the pair of eccentric pins 73b and thus moves rotationally without any change in angle (direction). Furthermore, the upper stand 71 is pressed in an up-down direction (vertical direction) relative to the lower stand 72 by means of presser portions 76 provided on the lower stand 72 while being allowed to move in the horizontal direction.

The linear motion mechanism 74 is a linear motion mechanism that utilizes what is called s link mechanism (crank mechanism). The linear motion mechanism 74 includes a link portion 74b and a connection member 74c which convert axial rotating motion of an eccentric pin 74a (crank shaft) performed by a servo motor 77 into lateral reciprocating motion of the lower stand 72. The lower stand 72 is pressed by presser portions 78 provided on the frame (not depicted in the drawings) of the lower frame 2b, so as not to move in the up-down direction (vertical direction) relative to the frame, while the front-back moving direction (up-down direction in the figure) of the lower stand 72 is regulated.

The driving mechanism 7 delicately controls the rotation angles of the gears 73a and eccentric pins 74a of the servo motors 75 and 77 to allow free control of the trajectory of the punch cutter in the X-Y horizontal direction. Furthermore, allowing the punch cutter to draw a curved trajectory enables an increase in speed. Moreover, varying the amount of eccentricity among the eccentric pins allows the travel distance of the punch cutter to be optionally varied. In the present embodiment, the driving mechanism 7 for the punch cutter 6 is provided on the lower frame 2b to move the mandrel 5 and the punch cutter 6 relative to each other. However, a driving mechanism for the die cutter 3 may be provided on the upper frame 2a so that the die cutter 3 moves to allow the mandrel 5 and the punch cutter 6 to move relative to each other.

Figure 12:
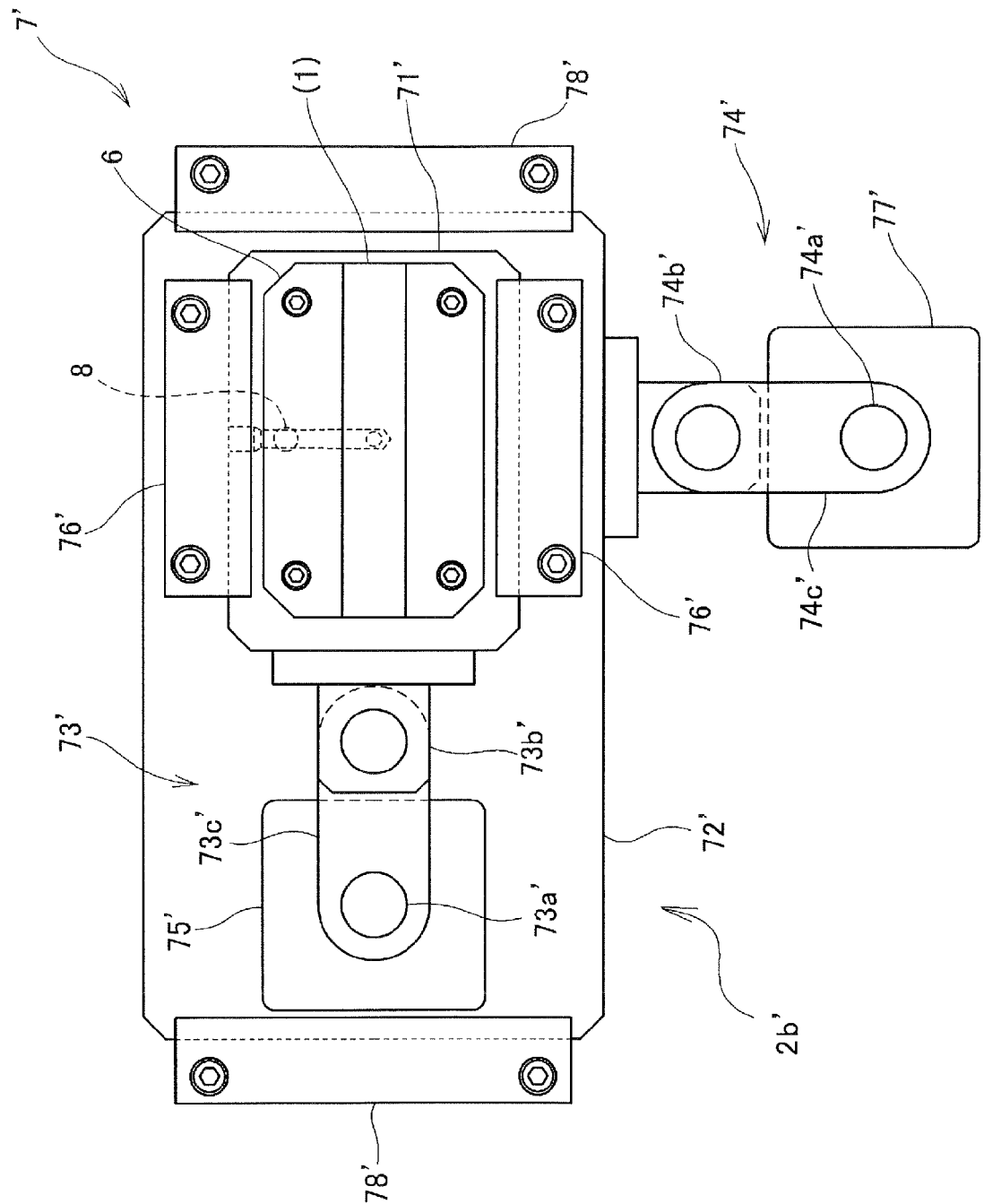
FIG. 12 is a plan view depicting another example of a lower frame.
Figure 13B:
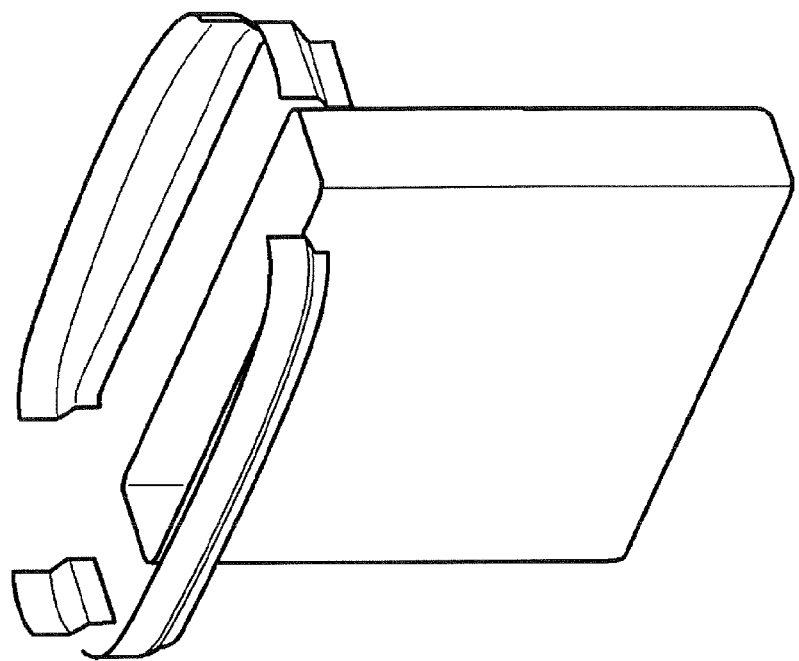
FIG. 13B depicts a state where long-side wall portions have subsequently been cut.
Figure 13A:
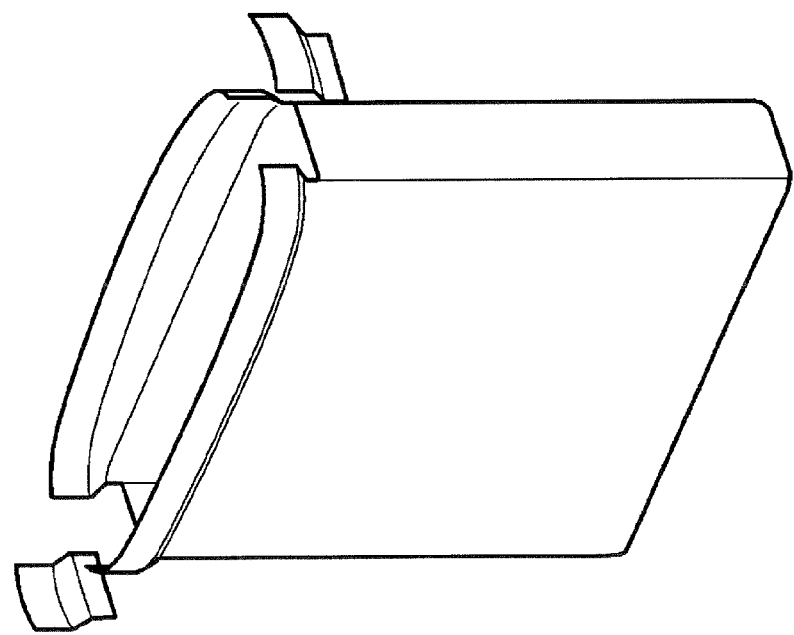
FIG. 13A depicts a state where short-side wall portions have been cut.
Figure 14:
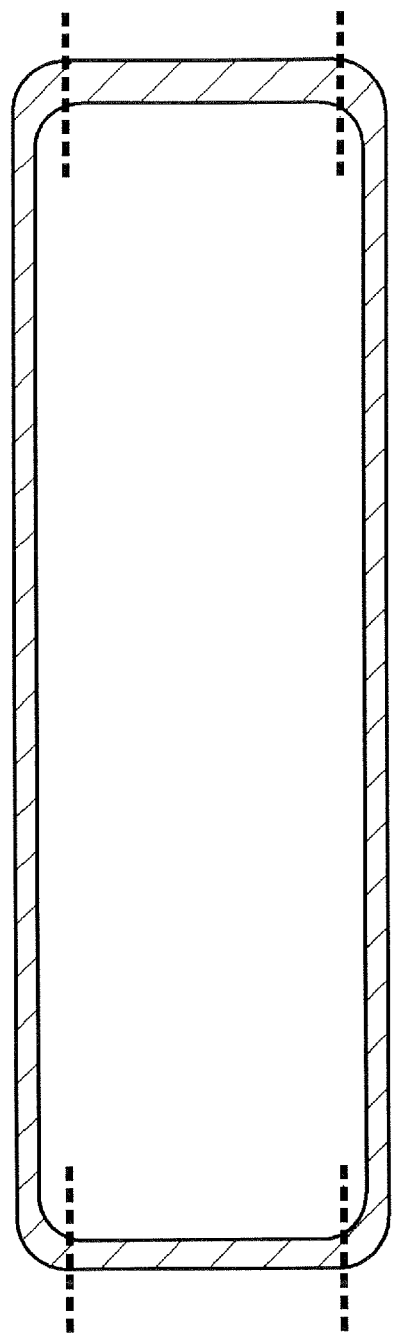
FIG. 14 is a schematic diagram depicting a cut surface resulting from conventional four-side cutting.

FIG. 12 is a plan view depicting another example of the lower frame of the apparatus trimming a rectangular container according to the present invention. A driving mechanism 7' is a combination of two linear motion mechanisms 74 described above. That is, the driving mechanism 7' substantially includes an upper stand 71' that supports the mandrel 5 and the punch cutter 6, a lower stand 72' that supports the upper stand 71', a linear motion mechanism 73' that reciprocates the upper stand 71' in the horizontal direction relative to the lower stand 72', and a linear motion mechanism 74' that reciprocates the lower stand 72' in the horizontal direction. The linear motion mechanism 73' is provided on the lower stand 72' to reciprocate the upper stand 71' in the lateral direction in the plan view in FIG. 12 relative to the lower stand 72'. On the other hand, the linear motion mechanism 74' reciprocates the lower stand 72' in the front-back direction (up-down direction in FIG. 4) in the plan view in FIG. 4.

Like the above-described linear motion mechanism 74, the linear motion mechanism 73' is a linear motion mechanism that utilizes what is called s link mechanism. The linear motion mechanism 73' includes a link portion 73b' and a connection member 73c' which convert axial rotating motion of an eccentric pin 73a' performed by a servo motor 75' into lateral reciprocating motion of the upper stand 71'. The linear motion mechanism 74' is also a mechanism similar to the above-described linear motion mechanisms 74 and 73', and includes a link portion 74b' and a connection member 74c' which convert axial rotating motion of an eccentric pin 74a' performed by a servomotor 77' into front-back reciprocating motion (up-down reciprocating motion in the plan view in FIG. 12) of the lower stand 72'. Furthermore, the upper stand 71' is pressed by presser portions 76' provided on the lower stand 72' so as not to move in the up-down direction (vertical direction) relative to the lower frame 72', while the front-back moving direction (up-down direction in the figure) of the upper stand 71' is regulated. Additionally, the lower stand 72' is pressed by presser portions 78' provided on a frame (not shown in figures) of the lower frame 2b' so as not to move in the up-down direction (vertical direction) relative to the frame, while the lateral moving direction of the lower stand 72' is regulated.

Like the driving mechanism 7, the driving mechanism 7' delicately controls the rotation angles of the gears 73a' and eccentric pins 74a' of the servo motors 75' and 77' to allow free control of the trajectory of the punch cutter in the X-Y horizontal direction.

In the present invention, the description of the rectangular container involves the container with a substantially rectangular cross section. However, the container may have a square cross section or may have a cross-sectional shape similar to these cross sections.

EXPLANATION OF REFERENCE NUMERALS

1 Intermediate of rectangular container
1a Rectangular container (product)
1b Removal portion
10 Rectangular tubular portion
11 Bottom portion
12 Opening end surface
13 Short-side wall portion
14 Long-side wall portion
2 Rectangular-container trimmer
2a Upper frame
2b Lower frame
3 Die cutter
4 Bottom pad
5 Mandrel
6 Punch cutter
60 Cutting edge portion
61 Short-side cutting edge portion
62 Long-side cutting edge portion
7 Driving mechanism
8 Air vacuum hole
9 Boundary line

The invention claimed is:

1. A method for trimming a rectangular container, the method comprising:
    initially positioning a punch cutter to cut from an inner peripheral surface to an outer peripheral surface of a rectangular tubular portion of the rectangular container;
    cutting through a wall portion of the rectangular tubular portion at a trim line on the rectangular tubular portion with the punch cutter so as to form an uncut boundary line portion that is inclined relative to a thickness direction of the wall portion; and
    then circumferentially moving the punch cutter along the trim line on the rectangular tubular portion to cut the rectangular tubular portion that remains such that the uncut boundary line portion is cut away last.

2. The method for trimming a rectangular container according to claim 1, wherein at least a cutting edge portion of the punch cutter which initially cuts into the rectangular tubular portion is nonparallel to the wall portion.

3. The method for trimming a rectangular container according to claim 1, wherein an entire circumference of a cutting edge portion of the punch cutter is nonparallel to the wall portion.

4. The method for trimming a rectangular container according to claim 1, wherein at least a cutting edge portion of the punch cutter which initially cuts into the rectangular tubular portion is triangular.

5. The method for trimming a rectangular container according to claim 1, wherein at least a cutting edge portion of the punch cutter which initially cuts into the rectangular tubular portion is shaped like a convex curve.

6. The method for trimming a rectangular container according to claim 1, wherein a cut made by the punch cutter in the inclined state is a cut made by moving the punch cutter in a direction of the inclination relative to the wall portion.

7. The method for trimming a rectangular container according to claim 1, wherein the rectangular container has a substantially rectangular cross section, and the punch cutter is initially allowed to cut into a short-side wall portion of the rectangular tubular portion.

8. The method for trimming a rectangular container according to claim 1, wherein a trajectory of circumferential movement of the punch cutter comprises only a curved trajectory.

* * * * *